United States Patent [19]
Yamaguchi

[11] Patent Number: 5,917,976
[45] Date of Patent: Jun. 29, 1999

[54] OPTICAL TRANSMISSION PATH COUPLING METHOD AND OPTICAL TRANSMISSION PATH COUPLING APPARATUS AS WELL AS OPTICAL AXIS SELF-ALIGNMENT TOOL

[75] Inventor: Takashi Yamaguchi, Minato-ku, Japan

[73] Assignee: Oki Electric Industry Co., Ltd., Tokyo, Japan

[21] Appl. No.: 08/946,249

[22] Filed: Oct. 7, 1997

[30] Foreign Application Priority Data

Apr. 23, 1997 [JP] Japan ................................ 9-106358

[51] Int. Cl.$^6$ .............................. G02B 6/00; G02B 6/36
[52] U.S. Cl. ............................................................. 385/88
[58] Field of Search ........................... 385/50–52, 88–99, 385/147

[56] References Cited

U.S. PATENT DOCUMENTS

| | | | |
|---|---|---|---|
| 5,438,216 | 8/1995 | Juskey et al. | 257/434 |
| 5,446,810 | 8/1995 | Watanabe et al. | 385/22 |
| 5,625,730 | 4/1997 | Ishikawa et al. | 385/49 |
| 5,742,487 | 4/1998 | Kobayashi et al. | 361/809 |
| 5,841,189 | 11/1998 | Shitama | 257/678 |
| 5,867,621 | 2/1999 | Luther et al. | 385/59 |

OTHER PUBLICATIONS

"Optical Parallel Transmission", SC–5–2, 1996 Electronics Society Meething of The Institute of Electronics Information and Communication Engineers of Japan.

Shingaku Gihou, "Plane Light Emitting Laser Two–dimensional Array Non–adjusted Core Loaded Push–Pull Type Module", LQE96–144 (1997–02).

*Primary Examiner*—Akm E. Ullah
*Attorney, Agent, or Firm*—Wenderoth, Lind & Ponack, L.L.P.

[57] ABSTRACT

To provide an optical transmission path coupling method and an optical transmission path coupling apparatus for preventing reduction in communication performance due to deterioration of optical elements and generation of dew as well as for accurately positioning the optical systems. An optical transmission apparatus includes guide pin holes provided on a Si substrate, and guide pins provided on an MPO connector and engaged with these guide pin holes to match mutual optical axes to thereby couple the optical transmission paths. Based on the guide pin holes, optical path windows, guide holes and bumps are formed. Pads for flip chip bonding in alignment with the bumps are formed on a light receiving element substrate. Based on these pads (based on the guide pin holes indirectly), light receiving elements are formed, and the optical axes of optical path windows and micro-lens array are matched by flip chip bonding.

27 Claims, 11 Drawing Sheets

F I G. 5
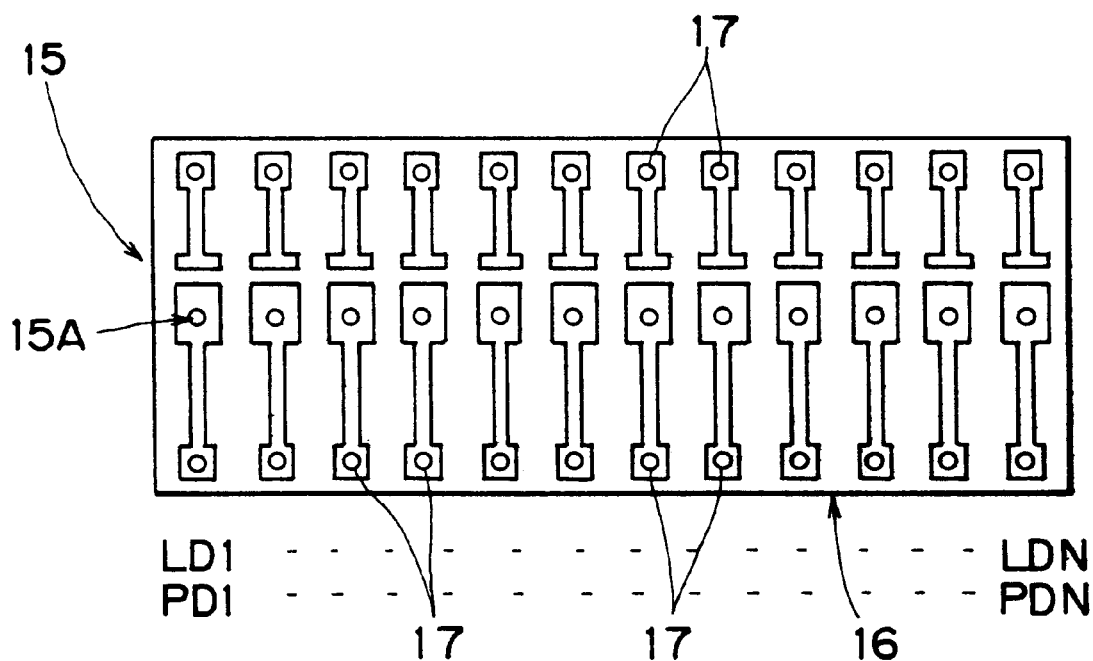

F I G. 1 1
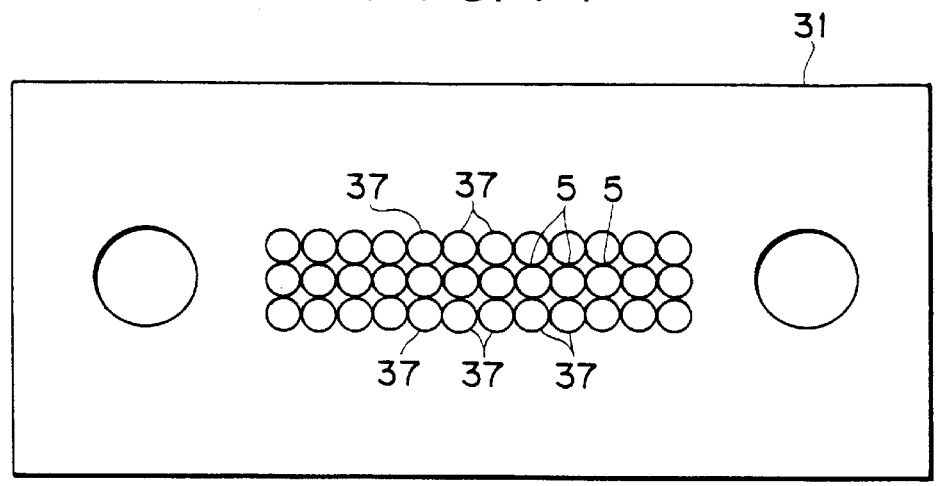
F I G. 1 2
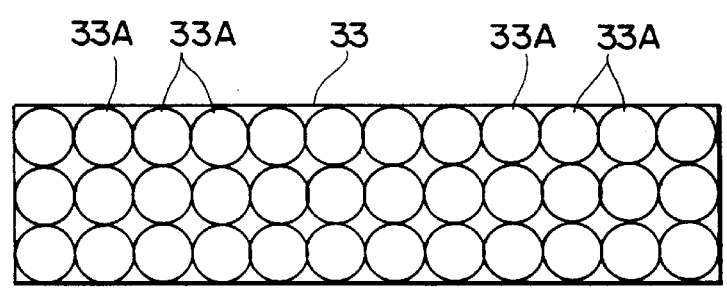
F I G. 1 3
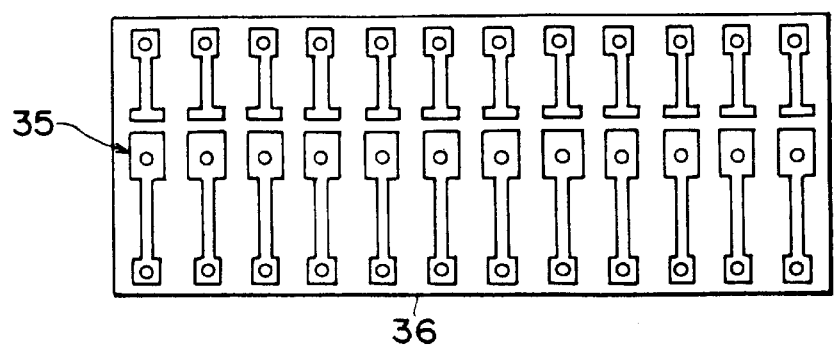

F I G. 1 5
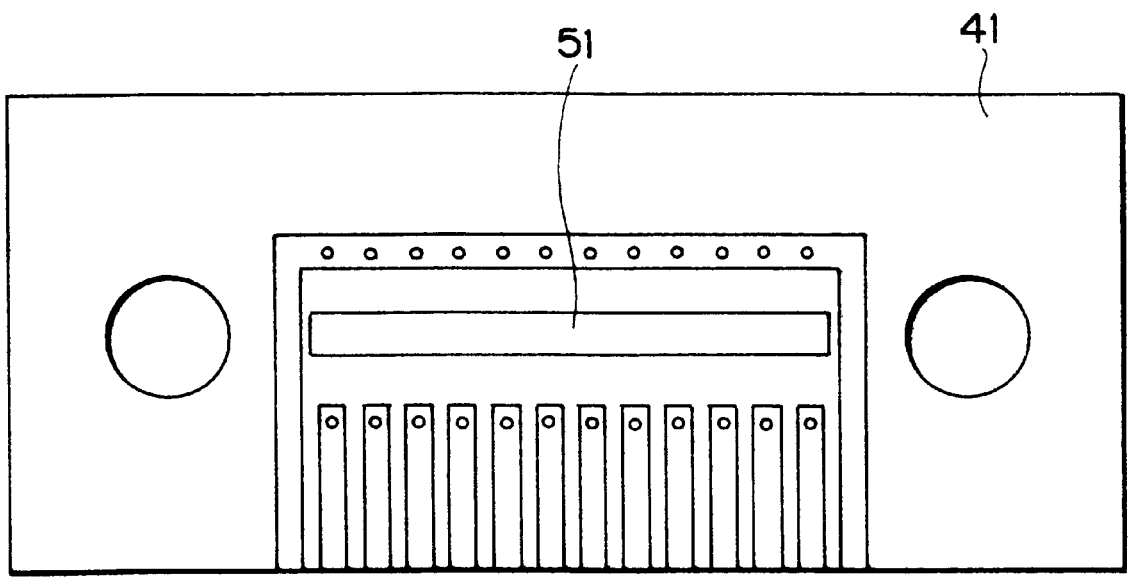

F I G. 1 9
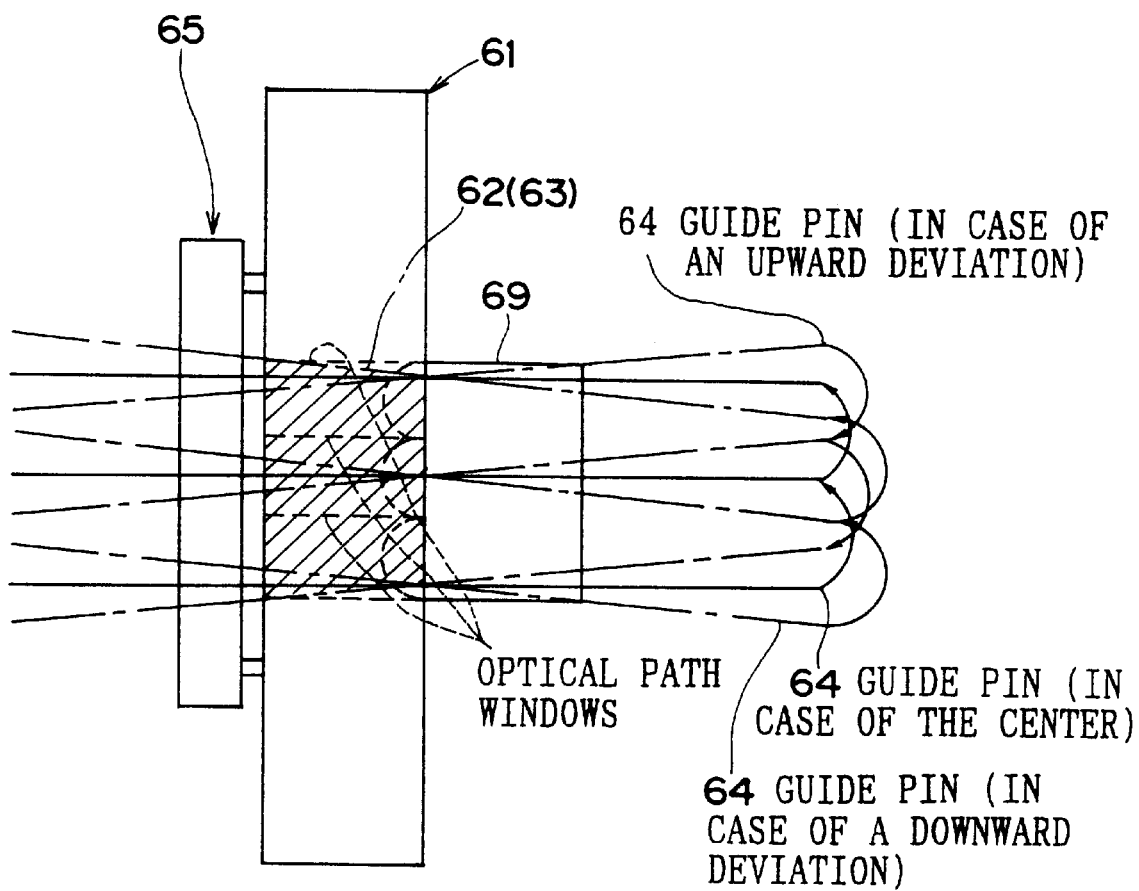

OPTICAL TRANSMISSION PATH COUPLING METHOD AND OPTICAL TRANSMISSION PATH COUPLING APPARATUS AS WELL AS OPTICAL AXIS SELF-ALIGNMENT TOOL

BACKGROUND OF THE INVENTION

1. Field of the Invention

The present invention relates to an optical transmission path coupling method and an optical transmission path coupling apparatus as well as an optical axis self-alignment tool for an optical inter-connection to be used for coupling optical transmission paths constituted by light emitting and receiving devices and a plurality of optical fibers for connecting between these devices, and relates more particularly to an optical transmission path coupling method and an optical transmission path coupling apparatus as well as an optical axis self-alignment tool capable of easily coupling a plurality of optical fibers to individual light emitting and receiving devices by accurately matching optical axes.

2. Description of the Related Art

Literature 1: "Optical Parallel Transmission", SC-5-2, at The 1996 Electronics Society Meeting of The Institute of Electronics Information and Communication Engineers of Japan.

Literature 2: "Plane Light Emitting Laser Two-dimensional Array Non-adjusted Core Loaded Push-Pull Type Module", LQE96-144 (1997-02), Shingaku Gihou.

As a conventional method of coupling an optical transmission path, the one as shown in FIG. 4 of the above-described literature 1 is known. According to this light emitting and receiving device, each device within the case is sealed and the inside of the case is filled with an inactive gas such as a nitrogen gas. By this arrangement, functional deterioration due to deterioration of the devices and generation of dew inside the devices and generation of dew between lenses and fibers is prevented. Further, errors inside the case are cancelled by adjustment at the time of optically coupling the devices.

On the other hand, as a method of fixing positioning of optical axes of a Si substrate loaded with the light emitting and receiving devices, a method shown in the above-described literature 2 is known. According to FIG. 4 and FIG. 7 of the literature 2, a Si substrate is positioned by utilizing guide holes for guide pins (standardized guide pins for an MPO connector). To be more specific, in a state that alignment bumps of an alignment head are engaged with alignment V holes of a Si substrate, the Si substrate is adsorbed by the alignment head, the guide pins of the alignment head are inserted into the guide pin holes of the package and the Si substrate is accurately positioned to the package, which is then fixed by soldering.

However, according to the above-described prior-art methods of coupling the optical transmission path, there have been the following problems.

The prior-art optical elements are weak in temperature characteristics, and therefore, are used under normal environments (under not high temperature or low temperature but under normal temperature environments). However, in recent years, the temperature characteristics of the optical elements have been improved substantially and there are an increasing number of optical elements that can function normally even under bad conditions such as under high-temperature or low-temperature environments. There are also many examples where the optical elements are used with necessity under severe conditions. This has generated other problems. Particularly, under low temperature environments, dew is generated between lenses and optical fibers. Namely, an external air including moisture is brought into contact with the surface of the optical elements cooled under low temperature environments, and dew is generated on this surface so that the dew interferes the transmission path, with a result that a transmitted light is diffusely reflected by the dew and can not be transmitted normally. As a result, there has been a problem that the function of the information transmission is lowered.

To cope with this situation, an inactive gas such as a nitrogen gas has so far been filled inside the apparatus and the apparatus has been sealed with a high-temperature waxing or the like. This method, however, has not been able to air-tight seal the inside completely, and has not been able to solve the basic problem. When the apparatus is sealed with a wax or the like, the optical elements can not be positioned in high precision, and the optical fibers and the module need to be adjusted at the final stage, which has aggravated the work efficiency. Further, when the adjustment at the final stage can not be done accurately, production yield is lowered and products near the finished product stage has to be abandoned, thus incurring a cost increase. Further, the inactive gas filling work has also been one of the elements of cost increase.

For preventing the generation of dew, there is also a method of directly coupling the front ends of the optical fibers and fusing them. This method however involves troublesome work for coupling and fusion, which is not efficient.

Moreover, when the optical coupling of the optical elements and optical fibers is carried out by using a connector, there is generated a space between these optical elements and optical fibers. Therefore, unless the optically coupled parts are sealed air-tight and are shielded from the external air, the quality of communication is deteriorated due to a generation of dew and an adhesion of dusts to the apparatus, resulting in an inability of communication in the worst case.

SUMMARY OF THE INVENTION

With a view to eliminating the above-described problems, it is an object of the present invention to provide an optical transmission path coupling method and an optical transmission path coupling apparatus as well as an optical axis self-alignment tool, at low costs in a simple structure, which can securely prevent a reduction in the performance of communication due to deterioration of optical elements and generation of dew.

In order to solve the above-described problems, according to the optical transmission path coupling method relating to a first mode of the present invention, in an optical transmission path coupling method for coupling optical transmission paths by matching mutual optical paths by engaging guide holes provided on one side member with guide pins provided on the other side member, bumps for fitting a substrate for an optical system and optical elements are disposed at specified positions based on the guide pin holes on the one side member or based on the guide pins on the other side member, pads for flip chip bonding are disposed at positions corresponding to the bumps of the substrate for optical elements to be fitted to the one side member or the other side member and the optical elements are disposed at positions corresponding to the optical system based on the pads, and optical axes of the optical system of the one side member or the other side member and optical axes of the optical elements of the substrate for optical elements are matched together automatically.

By the above-described method, the positions of the bumps for fitting the substrate for optical elements are specified based on the guide pin holes or the guide pins, the positions of the pads for flip chip bonding are specified based on the bumps, and the positions of the optical elements are specified based on the pads. Therefore, when the bumps and the pads are mutually connected accurately by the flip chip bonding, the optical axes of the optical system and the optical axes of the optical elements are matched automatically.

According to the optical transmission path coupling method relating to a second mode of the present invention, in an optical transmission path coupling method for coupling optical transmission paths by matching mutual optical paths by engaging guide holes provided on one side member with guide pins provided on the other side member, windows for optical paths are provided and guide holes disposed at specified positions based on the optical path windows are provided respectively on the one side member or the other side member, a micro-lens array is disposed to face the optical path windows and the guide holes, the micro-lens array is structured by a plurality of micro-lenses having projections, one part of which becoming optical transmission lenses disposed to match their corresponding optical axes with the optical path windows and the other part of which becoming positioning lenses for carrying out positioning by engaging projections of the other part with the guide holes, and the projections of the positioning lenses are engaged with the guide holes so that the optical axes of the optical transmission lenses are matched with the optical axes of the optical transmission windows.

By the above-described method, when the projections of the positioning lenses are engaged with the guide holes, the positioning lenses and the guide holes are positioned to match together. With this arrangement, the transmission lenses having a specified positional relation with the positional lenses and the optical path windows having a specified positional relation with the guide holes are matched together so that their optical axes are matched together.

According to the optical transmission path coupling method relating to a third mode of the present invention, in an optical transmission path coupling method for coupling optical transmission paths by matching mutual optical paths by engaging guide holes provided on one side member with guide pins provided on the other side member, windows for optical paths are provided and guide holes disposed at specified positions based on the optical path windows are provided respectively on the one side member or the other side member, a micro-lens array is disposed to face the optical path windows and the guide holes, the micro-lens array is structured by a plurality of micro-lenses, one part of which becoming optical transmission lenses disposed to match their corresponding optical axes with the optical path windows and the other part of which becoming positioning lenses for carrying out positioning by being engaged with the guide holes, and the projections of the positioning lenses are engaged with the guide holes so that the optical axes of the optical transmission lenses are matched with the optical axes of the optical transmission windows.

By the above-described method, when the positioning lenses are engaged with the guide holes, the positioning lenses and the guide holes are positioned to match together. With this arrangement, the transmission lenses having a specified positional relation with the positional lenses and the optical path windows having a specified positional relation with the guide holes are matched together so that their optical axes are matched together.

According to the optical transmission path coupling method relating to a fourth mode of the present invention, the guide holes are used as optical path windows.

By the above-described method, when the number of the optical transmission paths such as optical fibers is increased, positioning and the optical transmission paths can be secured at the same time.

According to the optical transmission path coupling method relating to a fifth mode of the present invention, in an optical transmission path coupling method for coupling optical transmission paths by matching mutual optical paths by engaging guide holes provided on one side member with guide pins provided on the other side member, bumps for fitting a substrate for an optical system and optical elements are disposed at specified positions based on the guide pin holes on the one side member or based on the guide pins on the other side member, pads for flip chip bonding are disposed at positions corresponding to the bumps of the substrate for optical elements to be fitted to the one side member or the other side member and the optical elements are disposed at positions corresponding to the optical system based on the pads, optical axes of the optical system on the one side member or the other side member and optical axes of the optical elements of the substrate for optical elements are matched together automatically by flip chip bonding the bumps and the pads, the optical system is structured by optical path windows and guide holes disposed at specified positions based on the optical path windows, and a micro-lens array is fitted to face the optical system, the micro-lens array is structured by a plurality of micro-lenses having projections, one part of which becoming optical transmission lenses disposed to match their corresponding optical axes with the optical path windows and the other part of which becoming positioning lenses for carrying out positioning by engaging projections of the other part with the guide holes, and the projections of the positioning lenses are engaged with the guide holes so that the optical axes of the optical transmission lenses are matched with the optical axes of the optical transmission windows.

By the above-described method, the positions of the bumps, pads and optical elements are specified, the optical axes of the optical system and the optical axes of the optical elements are matched automatically, and the positioning lenses and the guide holes are positioned so that the optical axes of the optical transmission lenses and the optical path windows are matched together.

According to the optical transmission path coupling method relating to a sixth mode of the present invention, in an optical transmission path coupling method for coupling optical transmission paths by matching mutual optical paths by engaging guide holes provided on one side member with guide pins provided on the other side member, bumps for fitting a substrate for an optical system and optical elements are disposed at specified positions based on the guide pin holes on the one side member or based on the guide pins on the other side member, pads for flip chip bonding are disposed at positions corresponding to the bumps of the substrate for optical elements to be fitted to the one side member or the other side member and the optical elements are disposed at positions corresponding to the optical system based on the pads, optical axes of the optical system of the one side member or the other side member are automatically matched with optical axes of the optical elements of the substrate for optical elements by flip chip bonding the bumps and the pads, the optical system being structured by optical path windows and guide holes disposed at specified positions based on the optical path windows, a micro-lens array is fitted to face the optical system, the micro-lens array being structured by a plurality of micro-lenses, one part of which becoming optical transmission lenses disposed to match their corresponding optical axes with the optical path windows and the other part of which becoming positioning lenses for carrying out positioning by being engaged with the guide holes, and the positioning lenses are engaged with the guide holes so that the optical axes of the optical transmission lenses are matched with the optical axes of the optical transmission windows.

By the above-described method, similar to the fifth mode of the present invention, the optical axes of the optical system and the optical axes of the optical elements are matched automatically and the optical axes of the optical transmission lenses and the optical path windows are matched together.

According to the optical transmission path coupling method relating to a seventh mode of the present invention, a one side member having guide pin holes are engaged with guide pins on the other side member so that mutual optical axes are matched together to couple respective optical transmission paths, the one side member having the guide pins is brought into contact with a base plane of a base stand by being engaged with the guide pins provided perpendicularly to the base plane of the base stand, and an element sealing model having guide pin holes is engaged with the guide pins so that they are coupled with each other in a state that the one side member and the optical axes are matched together.

With the above-described method, when the one side member is brought into contact with the base plane of the base stand by engaging the guide pins of the base stand with the guide pin holes of the one side member, the optical axes of the one side member and the optical axes of the guide pins of the base stand match together. Further, when the element sealing model is brought into contact with the one side member by engaging the guide pins of the base stand with the guide pin holes of the element sealing model, the optical axes of the guide pin holes of the element sealing model and the optical axes of the guide pins match together. Thus, the optical axes of the guide pin holes of the one side member and the optical axes of the guide pin holes of the element sealing model match together. In this state, the one side member and the element sealing model are mutually coupled.

According to the optical transmission path coupling apparatus relating to an eighth mode of the present invention, in an optical transmission path coupling apparatus for coupling optical transmission paths including a one side member having guide pin holes and the other side member having guide pins for coupling optical transmission paths by engaging the mutual optical axes, the apparatus includes bumps for fitting a substrate for an optical system and optical elements disposed at specified positions based on the guide pin holes on the one side member or based on the guide pins on the other side member, an optical element substrate provided on the one side member or the other side member so as to face the bumps, for loading and supporting optical elements of which optical axes match the optical transmission path, pads for flip chip bonding are disposed at positions corresponding to the bumps of the substrate for optical elements, and optical elements disposed at positions corresponding to the optical system based on the pads of the optical element substrate, so that the substrate for optical elements is fitted to the one side member or the other side member by flip chip bonding the bumps and the pads in a state that the optical axes of the optical system and the optical elements match together.

By the above-described structure, the positions of the bumps for fitting the substrate for optical elements are specified based on the guide pin holes or the guide pins, the positions of the pads for flip chip bonding are specified based on the bumps, and the positions of the optical elements are specified based on the pads. Therefore, when the bumps and the pads are connected together accurately by the flip chip bonding, the optical axes of the optical system and the optical axes of the optical elements are matched automatically.

According to the optical transmission path coupling apparatus relating to a ninth mode of the present invention, an optical system provided on the one side member or the other side member is structured by windows for optical paths and guide holes disposed at specified positions based on the optical path windows, a micro-lens array is disposed to face the optical path windows on the one side member or the other side member, the micro-lens array being structured by a plurality of micro-lenses having projections, one part of which becoming optical transmission lenses disposed to match their corresponding optical axes with the optical path windows and the other part of which being disposed to face the guide holes at specified positions based on the optical transmission lenses and becoming positioning lenses for matching the optical axes of the optical transmission lenses and the optical path windows together by engaging the projections with the guide holes.

By the above-described structure, when the projections of the positioning lenses are engaged with the guide holes, the positioning lenses and the guide holes are positioned to match together. With this arrangement, the transmission lenses having a specified positional relation with the positional lenses and the optical path windows having a specified positional relation with the guide holes are matched together so that their optical axes are matched together.

According to the optical transmission path coupling apparatus relating to a tenth mode of the present invention, an optical system provided on the one side member or the other side member is structured by windows for optical paths and guide holes disposed at specified positions based on the optical path windows, a micro-lens array is disposed to face the optical path windows on the one side member or the other side member, the micro-lens array being structured by a plurality of micro-lenses, one part of which becoming optical transmission lenses disposed to match their corresponding optical axes with the optical path windows and the other part of which being disposed to face the guide holes at specified positions based on the optical transmission lenses and becoming positioning lenses for matching the optical axes of the optical transmission lenses and the optical path windows together by being engaged with the guide holes.

By the above-described structure, when the positioning lenses are engaged with the guide holes, the positioning lenses and the guide holes are positioned to match together. With this arrangement, the transmission lenses having a specified positional relation with the positional lenses and the optical path windows having a specified positional relation with the guide holes are matched together so that their optical axes are matched together.

According to the optical transmission path coupling apparatus relating to an eleventh mode of the present invention, the guide holes are used as optical path windows.

By the above-described structure, when the number of the optical transmission paths such as optical fibers is increased, positioning and the optical transmission paths can be secured at the same time.

According to the optical transmission path coupling apparatus relating to a twelfth mode of the present invention, in an optical transmission path coupling apparatus for coupling optical transmission paths including a one side member having guide pin holes and the other side member having guide pins for coupling optical transmission paths by engaging the mutual optical axes, the apparatus includes bumps for fitting a substrate for an optical system and optical elements disposed at specified positions based on the guide pin holes on the one side member or based on the guide pins on the other side member, an optical element substrate provided on the one side member or the other side member so as to face the bumps, for loading and supporting optical elements of which optical axes match the optical transmission path, pads for flip chip bonding are disposed at positions corresponding to the bumps of the substrate for optical elements, and optical elements disposed at positions corresponding to the optical system based on the pads of the optical element substrate, so that the substrate for optical elements is fitted to the one side member or the other side member by flip chip bonding the bumps and the pads in a state that the optical axes of the optical system and the optical elements match together, the optical system is structured by windows for optical paths and guide holes disposed at specified positions based on the optical path windows, a micro-lens array is disposed to face the optical path windows on the one side member or the other side member, the micro-lens array being structured by a plurality of micro-lenses having projections, one part of which becoming optical transmission lenses disposed to match their corresponding optical axes with the optical path windows and the other part of which being disposed to face the guide holes at specified positions based on the optical transmission lenses and becoming positioning lenses for matching the optical axes of the optical transmission lenses and the optical path windows together by engaging the projections with the guide holes.

By the above-described structure, the positions of the bumps, pads and optical elements are specified, the optical axes of the optical system and the optical axes of the optical elements are matched automatically, and the positioning lenses and the guide holes are positioned so that the optical axes of the optical transmission lenses and the optical path windows are matched together.

According to the optical transmission path coupling apparatus relating to a thirteenth mode of the present invention, in an optical transmission path coupling apparatus for coupling optical transmission paths including a one side member having guide pin holes and the other side member having guide pins for coupling optical transmission paths by engaging the mutual optical axes, the apparatus includes bumps for fitting a substrate for an optical system and optical elements disposed at specified positions based on the guide pin holes on the one side member or based on the guide pins on the other side member, an optical element substrate provided on the one side member or the other side member so as to face the bumps, for loading and supporting optical elements of which optical axes match the optical transmission path, pads for flip chip bonding are disposed at positions corresponding to the bumps of the substrate for optical elements, and optical elements disposed at positions corresponding to the optical system based on the pads of the optical element substrate, so that the substrate for optical elements is fitted to the one side member or the other side member by flip chip bonding the bumps and the pads in a state that the optical axes of the optical system and the optical elements match together, the optical system is structured by windows for optical paths and guide holes disposed at specified positions based on the optical path windows, a micro-lens array is disposed to face the optical path windows on the one side member or the other side member, the micro-lens array being structured by a plurality of micro-lenses, one part of which becoming optical transmission lenses disposed to match their corresponding optical axes with the optical path windows and the other part of which being disposed to face the guide holes at specified positions based on the optical transmission lenses and becoming positioning lenses for matching the optical axes of the optical transmission lenses and the optical path windows together by being engaged with the guide holes.

By the above-described structure, similar to the twelfth mode of the present invention, the optical axes of the optical system and the optical axes of the optical elements are matched automatically and the optical axes of the optical transmission lenses and the optical path windows are matched together.

According to the optical transmission path coupling apparatus relating to a fourteenth mode of the present invention, the positioning lens and optical transmission lens are disposed by one or by a plurality of number respectively.

By the above-described structure, the positioning lens and optical transmission lens are disposed by one or by a plurality of number respectively according to the number of the optical transmission path.

According to the optical transmission path coupling apparatus relating to a fifteenth mode of the present invention, the optical transmission path is structured by using optical fibers and the front ends of the optical fibers are directly contacted to the rear surface of the optical transmission lens.

By the above-described structure, there is no gap between the optical fibers and the optical transmission lenses so that air including moisture cannot come between them. As a result, the problem that the function is lowered by the dew of the optical transmission path can be solved.

According to the optical axis self-alignment tool relating to a sixteenth mode of the present invention, the tool is structured by a base stand for bringing a substrate having guide pins into contact with the base plane of the base stand and adjusting the optical axes of the guide pins perpendicularly to the base plane, and guide pins disposed perpendicularly to the base plane of the base stand and for supporting a plurality of substrates having guide pin holes in a state of matching together the optical axes of the substrates at the time of coupling the substrates together by being superposed with each other.

By the above-described structure, when the guide pins of the base stand are engaged with the guide pin holes of a first substrate and this substrate is brought into contact with the base plane of the base stand, the optical axes of the guide pin holes of the substrate match the optical axes of the guide pins of the substrate. Thus, the optical axes of the guide pin holes of the first substrate match the optical axes of the guide pin holes of a second substrate. These substrates are mutually coupled in this state. To couple three or more substrates, this operation is repeated.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 5 is a front view for showing a light receiving element substrate 16 having the light receiving element array 1;

FIG. 11 is a front view for showing the other side plane of the Si substrate;

FIG. 12 is a front view for showing the micro-lens array;

FIG. 13 is a front view for showing a light receiving element substrate having a light receiving element array;

FIG. 15 is a front view for showing one side plane of the Si substrate;

FIG. 19 is a schematic view for showing an optical axial deviation due to an error when guide pin holes of a Si substrate are formed by the anisotropic etching technique.

DESCRIPTION OF THE PREFERRED EMBODIMENTS

The embodiments of the present invention will be explained below with reference to the attached drawings.
[First Embodiment]
The optical transmission path coupling apparatus relating to a first embodiment of the present invention will be explained below.

Figure 1:
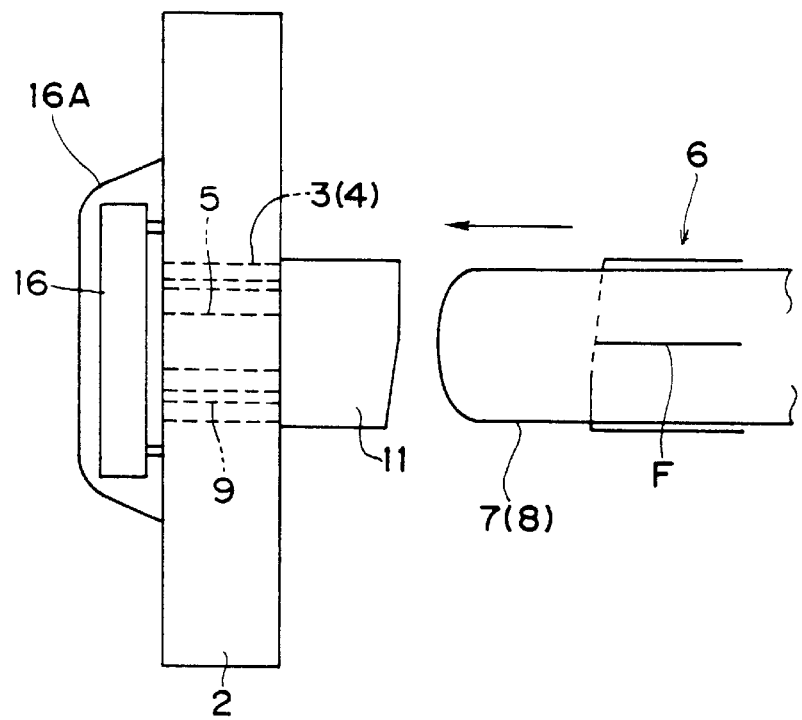
FIG. 1 is a side view for showing a state of coupling an MPO connector with an MPO adapter having integrally coupled a light receiving element substrate and a micro-lens array with a Si substrate.
Figure 2:
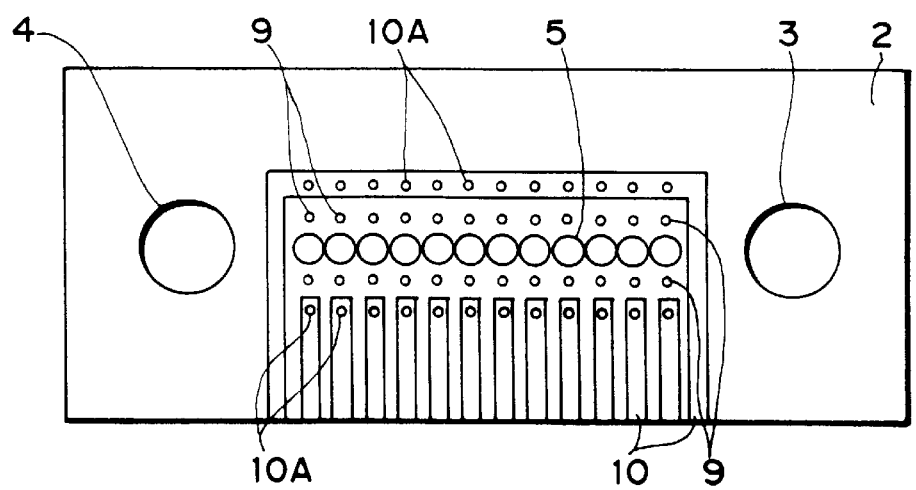
FIG. 2 is a front view for showing one side plane of the Si substrate generated by silicon wafer.
Figure 3:
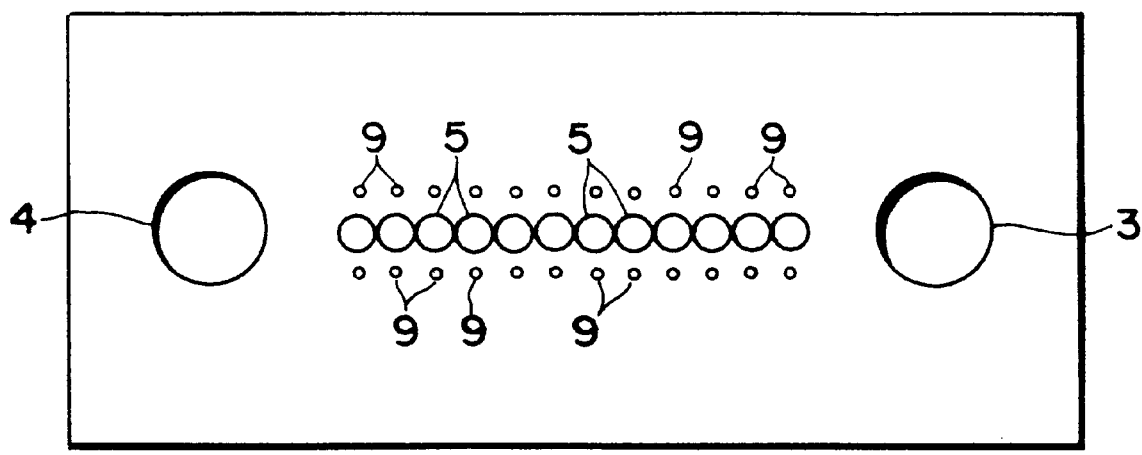
FIG. 3 is a rear side view for showing the other side plane of the Si substrate.
Figure 4:
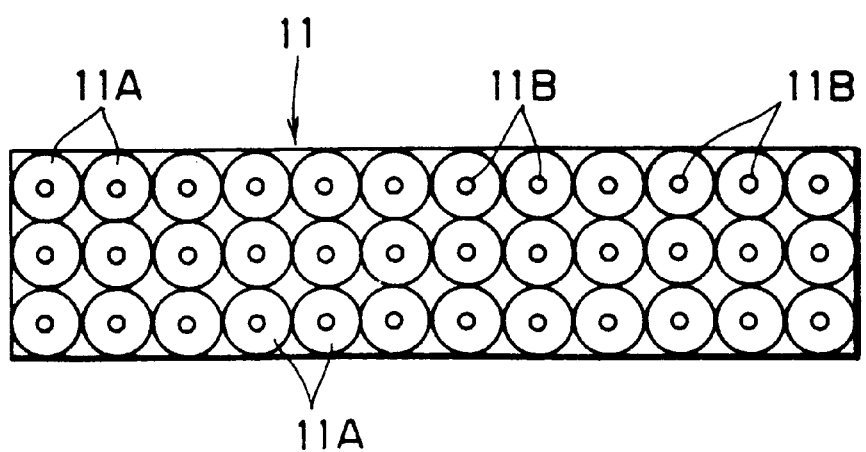
FIG. 4 is a front view for showing a micro-lens array 11.

FIGS. 1 to 5 are diagrams for showing the optical transmission path coupling apparatus relating to the first embodiment; FIG. 1 is a side view for showing a state of coupling an MPO connector 6 with an MPO adapter having integrally coupled a light receiving element substrate 16 and a micro-lens array 11 with a Si substrate 2; FIG. 2 is a front view for showing one side plane of a Si substrate 2 generated by silicon wafer; FIG. 3 is rear side view for showing the other side plane of the Si substrate 2; FIG. 4 is a front view for showing the micro-lens array 11; and FIG. 5 is a front view for showing the light receiving element substrate 16 having the light receiving element array 15.

The Si substrate 2 is formed in a thick rectangular shape. Two guide pin holes 3 and 4 are provided on this Si substrate 2. The diameters of the guide pin holes 3 and 4 and the distance therebetween are formed along the standard of the MPO connector 5. To be more specific, they are formed in high precision in alignment with the diameters of guide pins 7 and 8 of the MPO connector 6 and the distance therebetween, and when the MPO connector 6 is coupled with the Si substrate 2, the guide pins 7 and 8 are engaged with the guide pin holes 3 and 4 so that the MPO connector 6 and the substrate 2 are positioned accurately. The guide pin holes 3 and 4 are through-holes piercing through the front surface to the rear surface of the substrate 2. An optical fiber array F is disposed within the MPO connector 6.

A plurality of optical path windows 5 are provided between the guide pin holes 3 and 4 of the Si substrate 2. The optical path windows 5 are provided in one string at the same pitch and by the same number (twelve in this case) corresponding to ferrules (optical connection members, not shown, provided in one string by being connected to the front ends of the optical fibers respectively) disposed in one string between the guide pins 7 and 8 of the MPO connector 6. Each of the optical path windows 5 is provided piercing through the front surface to the rear surface of the Si substrate 2. The diameter of each optical path window 5 is set to be slightly larger than the aperture of each micro-lens 11A of the micro-lens array 11 to be described later in detail, so that all the light beams passing through each micro-lens 11A are passed to the inside.

On both sides of each optical path window 5 of the Si substrate 2, guide holes 9 are provided at the same pitch and by the same number corresponding to the optical path windows 5. The distance between the center of each guide hole 9 and the center of each optical path window 5 (that is, the distance between the centers in a direction orthogonal with the layout direction of the optical path window 5) is the same as the distance between the centers of the micro-lenses 11A of the micro-lens array 11, and the diameter of each guide hole 9 is set at a size for engaging with a projection 11B of each micro-lens 11A.

On one side surface of the Si substrate 2, a wiring pattern 10 is formed as shown in FIGS. 2 and 3. This wiring pattern 10 is prepared as follows. At first, a SiO2 film is formed on the Si substrate 2, and a metal pattern is formed as the wiring pattern 10 on this surface. Bumps 10A for loading according to the flip chip bonding method are being prepared at necessary positions on the wiring pattern 10. The bumps 10A are provided at positions with a predetermined distance from the optical path windows 5. The SiO2 at the portions where the holes are prepared is eliminated and the guide pin holes 3 and 4 are formed there by chemical processing. For the Si substrate 2, a (110) plane is used, on which through-holes are formed by chemical etching. The holes 3, 4, 5 and 9 are prepared in high precision by photography.

FIG. 4 shows the micro-lens array 11. The micro-lens array 11 is prepared by providing the small micro-lenses 11A by a large number in vertical and lateral directions by adjusting refractive index distribution and by directly providing swells on a glass substrate or the like. In FIG. 4, the small micro-lenses 11A are provided in three strings with twelve micro-lenses in each string. The pitch of the micro-lenses 11A of the micro-lens array 11 is set at the same pitch as that of the optical path windows 5 and the guide holes 9 corresponding to the ferrules of the optical fibers. These are prepared in high precision by photolithography. Each micro-lens 11A of the micro-lens array 11 is formed to have a projection at the center of the external surface in order to have an increased optical coupling efficiency. The rear surface the micro-lens array 11 is ground in oblique in order to minimize reflection of light at the time of achieving an optical coupling with the optical fibers. The ferrule of each optical fiber is directly contacted with the rear surface of the micro-lens array 11 to achieve an optical coupling without an existence of a layer of air in the middle.

The light receiving element substrate 16 is structured to have the light receiving element array 15 as shown in FIG. 5. A light emitting element array also has a similar structure. Light receiving elements 15A and pads 17 as current input and output terminals that constitute the light receiving element array 11 are prepared in high precision by photolithography on the surface of the light receiving element substrate 16. The pitch of the light receiving elements 15A is set at the same pitch as the pitch of the optical path windows 5 corresponding to the ferrules of the optical fibers. Thus, the center (optical axis) of the light receiving section of each light receiving element 15A coincides with the center (optical axis) of each corresponding optical path window 5 in a state that the light receiving element substrate 16 is fitted correctly to the Si substrate 2.

The pads 17 provided at the base end portion of the circuit constituting the light receiving elements 15A are prepared in high precision at positions with a predetermined distance from the light receiving elements 15A and are positioned accurately. In other words, each pad and each corresponding bump 10A on the substrate 2 are disposed to be in accurate alignment with each other in a state that the optical axis of each light receiving element 15A matches the optical axis of each corresponding optical path window 5.

As the light receiving elements 15A, photo-diodes or others are used, and as the light emitting elements, laser diodes for plane light emission and LEDs or others are used.

Figure 6:
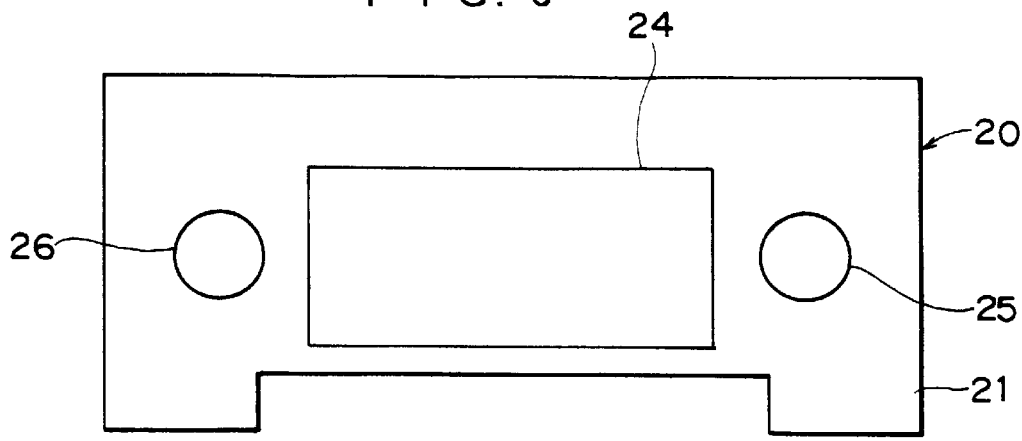
FIG. 6 is a front view for showing a frame section of a light receiving element protection model.
Figure 7:
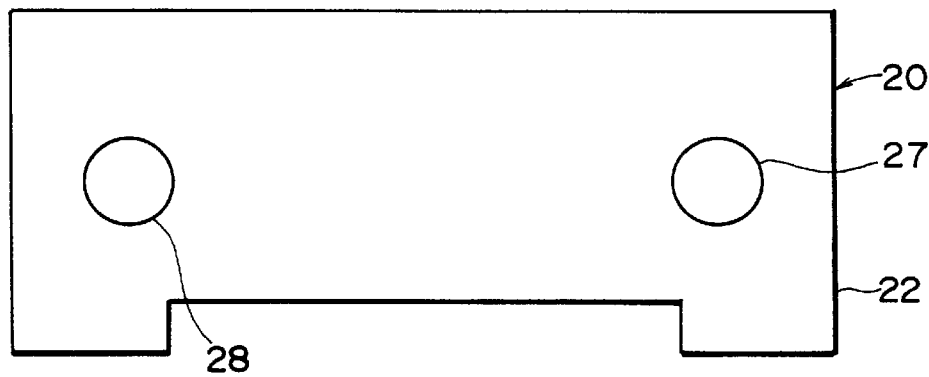
FIG. 7 is a front view for showing a lid section of the light receiving element protection model.

The light receiving element substrate 16 and the Si substrate 2 are connected together by thermal processing based on the flip chip bonding method, by connecting the pads 17 and bumps 10A together. By the self-alignment function according to this method, the optical axis of each light receiving element 15A and the optical axis of each corresponding optical path window 5 are positioned in high precision. The light receiving element substrate 16 is sealed to the Si substrate 2. For this method, a synthetic resin 16A is generally used, because the cost of the synthetic resin 16A is low and economical. However, for obtaining a more rigid and secure sealing than based on the synthetic resin 16A, a light receiving element protection model 20 shown in FIGS. 6 and 7 may also be used. This light receiving element protection model 20 is prepared by silicon wafer or ceramics. In more detail, this is structured by a frame section 21 and a lid section 22. As shown in FIG. 6, the frame section 21 is structured to include a substrate protection hole 24 formed in a rectangular shape for its plane almost similar to the Si substrate 2 and having room for engaging with the light receiving element substrate 16 on its center, and guide pin holes 25 and 26 for accurately matching with the guide pin holes 3 and 4 of the Si substrate 2. The outer shape of the lid section 22 is formed in a shape similar to that of the frame section 21, and is structured to include guide pin holes 27 and 28 which accurately match with the guide pin holes 3 and 4 of the Si substrate 2. The frame section 21 having the above-described structure is connected with the Si substrate 2 in a state that the light receiving element substrate 16 is fitted to the Si substrate 2, that this light receiving element substrate 16 is engaged with the substrate protection hole 24, and that the guide pin holes 25 and 26 are in accurate alignment with the guide pin holes 3 and 4 of the Si substrate 2. Then, the lid section 22 is coupled with the frame section 21 from the outside of the frame section 21 by matching the guide pin holes 27 and 28 with the guide pin holes 3 and 4 of the Si substrate 2. They are firmly connected with each other with an adhesive agent or the like. With this arrangement, the guide pin holes 3, 4, 25, 26, 27 and 28 are mutually aligned so that the guide pins 7 and 8 can be inserted smoothly and accurately.

By engaging the projections 11B of the micro-lenses 11A on both outside strings of the micro-lens array 11 with the respective guide holes 9, the micro-lenses 11A on the center strings are aligned in high precision with the optical path windows 5 of the Si substrate 2. With this arrangement, the micro-lens array 11 is fitted to the Si substrate 2 in a state that the optical axis of each micro-lens 11A and the optical axis of each corresponding optical path window 5 are in accurate alignment. The micro-lens array 11 and the Si substrate 2 are coupled together by glass sealing or with an adhesive agent, or the like.

The module of the above-described structure is formed as an MPO adaptor by covering the outside of the module with plastics or the like. When the MPO connector 6 is connected to this MPO adaptor, the optical axis of each ferrule of the MPO connector 6 and the optical axis of each micro-lens 11A (and further the optical path window 5 and the light receiving element 15A) of the micro-lens array 11 of the MPO adaptor match together accurately, and the optical paths are optically connected before and after these portions.
[Operation]

According to the optical transmission path coupling apparatus having the above-described structure, the MPO connector 6 is inserted into the MPO adaptor. At this time, the guide pins 7 and 8 of the MPO connector 6 are inserted into the guide pin holes 3 and 4 (15, 26, 27 and 28) of the Si substrate 2, and the MPO connector 6 is coupled with the MPO adaptor together. At this time, the ferrules of the MPO connector 6 are brought into direct contact with the micro-lenses 11A of the micro-lens array 11 so that the optical fibers (ferrules) of the MPO connector 6 side, the micro-lenses 11A of the micro-lens array 11, the optical path windows 5 of the Si substrate 2 and the light receiving elements 15A of the light receiving element substrate 16 are brought into accurate alignment on the same optical axis.

As a result, optical signals transmitted through the optical fibers are incident into the micro-lenses 11A from the ferrules and are focussed there and are then entered to the light receiving elements 15A through the optical path windows 5.

When light emitting elements are provided at the portion of the light receiving element substrate 16, optical signals are transmitted to the optical fibers through the routes opposite to the above.
[Effects]
(1) Since the ferrules at the front end of the optical fibers and the micro-lenses 11A of the micro-lens array 11 are brought into direct contact with each other and also since the optical path windows 5 forming a space from the micro-lenses 11A to the light receiving elements 15A are sealed by the micro-lens array 11 and the light receiving element substrate 16 (or the frame section 21 and the lid section 22), there is no portion where an external air exists between the optical fibers and the light receiving elements. As a result, the optical transmission path will never be affected by a moisture of an external air to cloud the inside under low-temperature environments or by a mixture of dusts, so that the durability and the reliability of the optical transmission path coupling apparatus 1 are improved substantially.

(2) Since the anisotropic etching technique and the photolithography technique are used for the (110) plane in the forming of the Si substrate 2, high-precision parts can be produced, which makes an accurate positioning.

(3) Since the bumps 10A of the Si substrate 2 and the pads 17 of the light receiving element substrate 16 are formed at accurate positions by the photolithography technique, the optical path windows 5 of the Si substrate 2 and the light receiving elements 15A of the light receiving element substrate 16 can be positioned together by flip chip bonding, so that the respective optical axes can be matched easily and in high precision.

(4) Since the guide holes 9 of the Si substrate 2 and the projections 11B of the micro-lens array 11 are formed at positions to achieve accurate alignment, the micro-lens array 11 and the Si substrate 2 can be positioned in high precision by engaging the projections 11B with the guide holes 9. Thus, the optical axis of each optical path window 5 of the Si substrate 2 and the optical axis of each micro-lens 11A of the micro-lens array 11 can be matched easily and in high precision.

(5) Based on the above-described effects, the optical transmission path from each optical fiber to each light receiving element 15A can be coupled extremely easily and in high precision.

[Second Embodiment]

A second embodiment of the present invention will be explained next.

Figure 9:
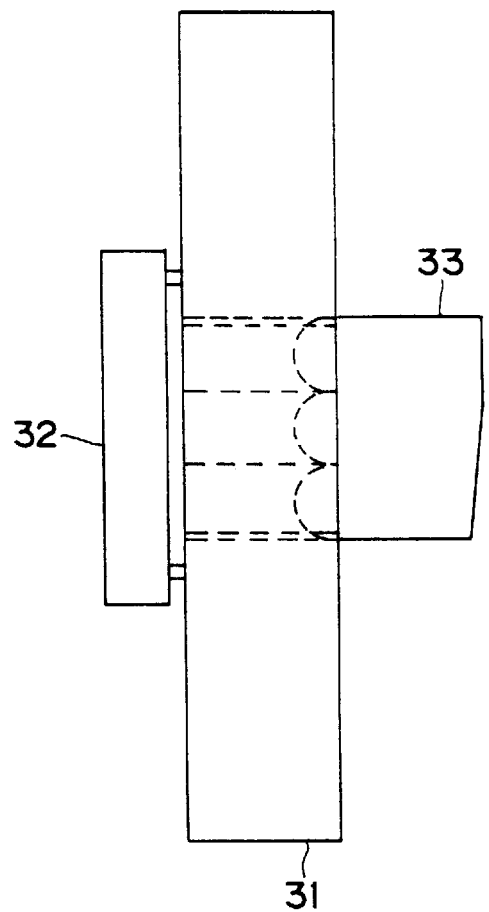
FIG. 9 is a side view for showing an MPO adaptor having integrally coupled a light receiving element substrate and a micro-lens array with a Si substrate relating to a second embodiment of the present invention.
Figure 10:
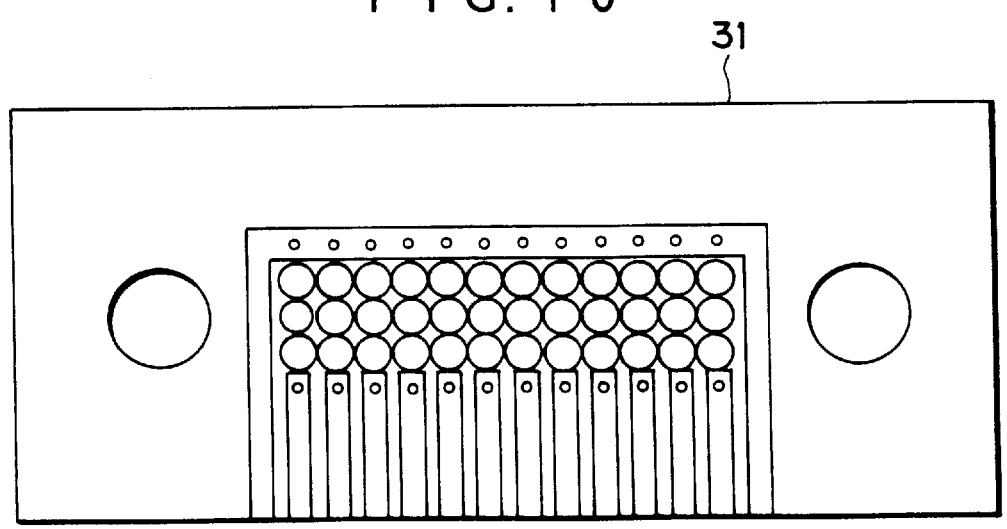
FIG. 10 is a front view for showing one side plane of the Si substrate.

FIG. 9 is a side view for showing an MPO adaptor having integrally coupled a light receiving element substrate 32 and a micro-lens array 33 with a Si substrate 31, FIG. 10 is a front view for showing one side plane of the Si substrate 31, FIG. 11 is a front view for showing the other side plane of a Si substrate 31, FIG. 12 is a front view for showing the micro-lens array 33, and FIG. 13 is a front view for showing a light receiving element substrate 36 having a light receiving element array 35.

Since the overall structure of the optical transmission path coupling apparatus relating to the present mode of implementation is almost similar to that of the optical transmission path coupling apparatus relating to the fist mode of implementation, the same portions are attached with the same reference numbers and their explanation will be omitted. The present mode of implementation is characterized in the micro-lens array 33 and guide holes 37 of the Si substrate 31.

The micro-lens array 33 has its micro-lenses 33A formed by a fine processing technique. These micro-lenses 33A are prepared by not changing the refractive index but by processing the surface of the panel of the micro-lens array 33 to have a swell. Accordingly, the surface of each micro-lens 33A has a projection.

The guide holes 37 of the Si substrate 31 are formed to have a diameter almost the same as that of the external shape of the micro-lenses 33A, as is the case with the optical path windows 5. This is for the micro-lenses 33A of the actually projecting micro-lens array 33 to engage with the guide holes 37. The positions at which the guide holes 37 are provided are the same as the positions of the guide holes 9 of the first mode of implementation.

[Operation]

The overall operation is similar to that of the first embodiment. In the present embodiment, when the micro-lens array 33 is fitted to the Si substrate 31, the micro-lenses 33A of both outside strings of the microlens array 33 are engaged with the guide holes 37. With this arrangement, the microlens array 33 is accurately positioned to the Si substrate 31, and the optical axes of the optical path windows 5 of the Si substrate 31 and the optical axes of the micro-lenses 33A of the micro-lens array 33 are coincided with each other.

[Effects]

(1) By engaging the micro-lenses 33A of the micro-lens array 33 with the guide holes 37, their respective optical axes can be matched easily and in high precision.

(2) Since the guide holes 37 of the Si substrate 31 have a similar structure to that of the optical path windows 5 and also since the micro-lenses 33A of the micro-lens array 33 corresponding to the guide holes 37 are similar to the micro-lenses 33A corresponding to the optical path windows 5, these guide holes 37 can be corresponded to the connection of maximum 36 optical fibers by having three strings in the light receiving element array 35 of the light receiving element substrate 36.

Further, of the guide holes 37, those of only one string may be used or only a part, for example one, of one string may be used without using the whole guide holes of one string. This is to be set according to the usage and the number of optical fibers.

[Third Embodiment]

Figure 14:
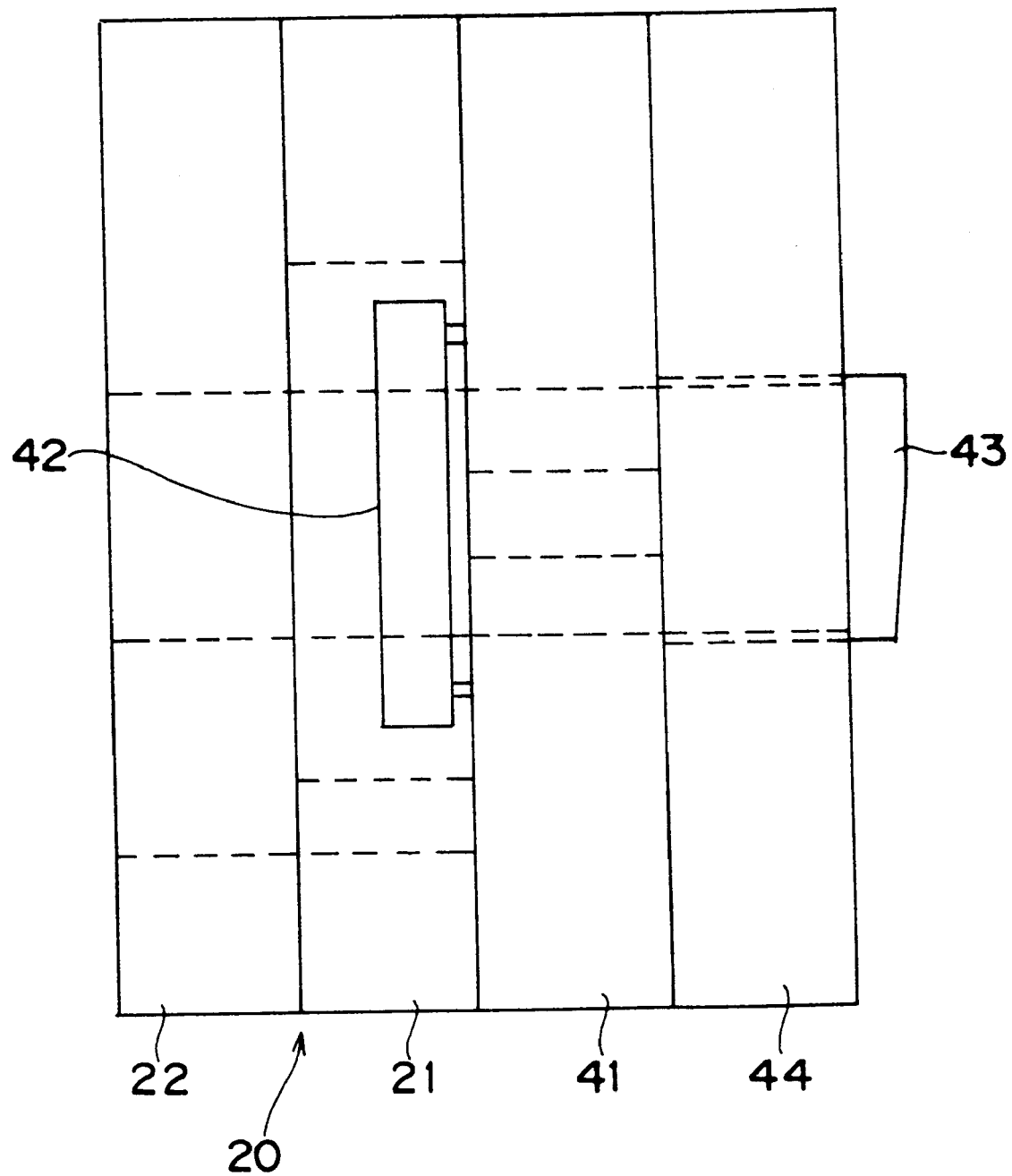
FIG. 14 is a side view for showing an MPO adaptor having provided a light receiving element protection model and a lens protection model in a state that a light receiving element substrate and a micro-lens array are integrally coupled with a Si substrate relating to a third embodiment of the present invention.
Figure 16:
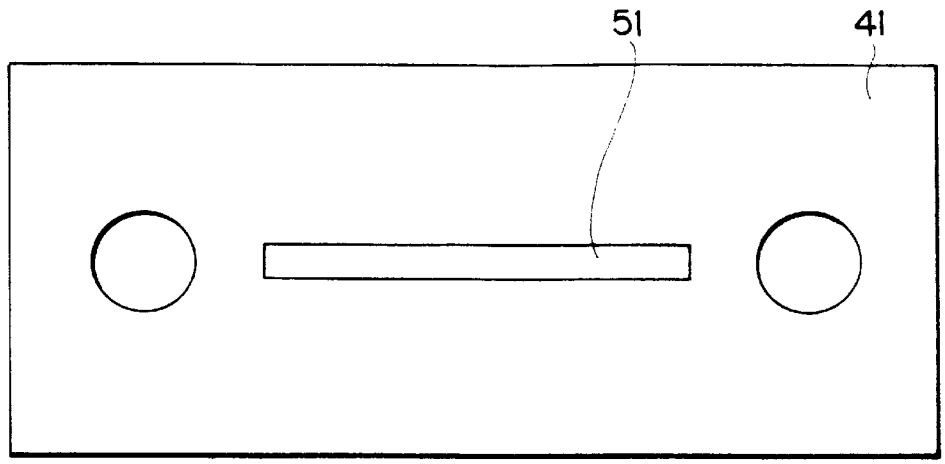
FIG. 16 is a front view for showing the other side plane of the Si substrate.
Figure 17:
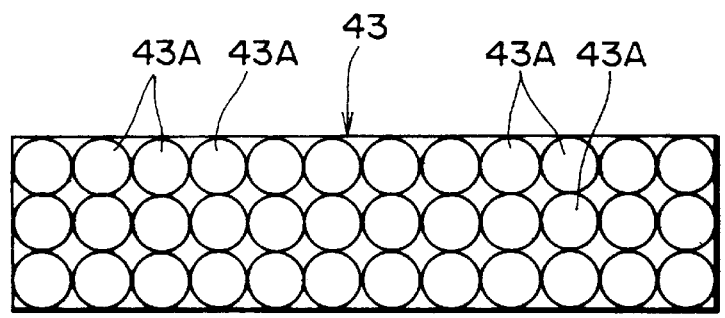
FIG. 17 is a front view for showing the micro-lens array.
Figure 18:
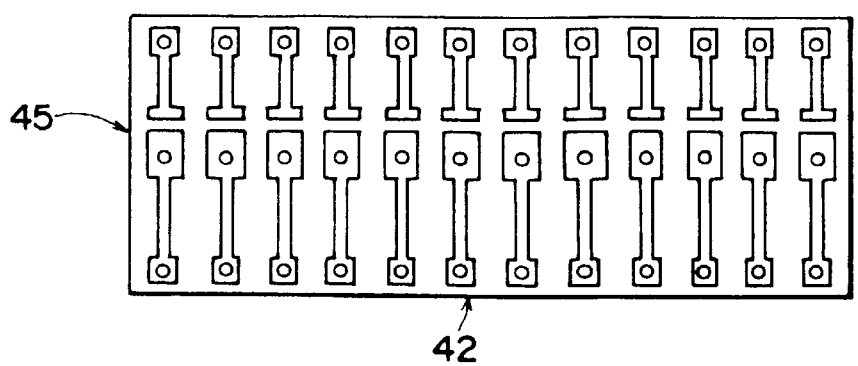
FIG. 18 is a front view for showing the light receiving element substrate having a light receiving element array.

FIG. 14 is a side view for showing an MPO adaptor having provided a light receiving element protection model 20 and a lens protection model 44 in a state that a light receiving element substrate 42 and a micro-lens array 43 are integrally coupled with a Si substrate 41, FIG. 15 is a front view for showing one side plane of the Si substrate 41, FIG. 16 is a front view for showing the other side plane of the Si substrate 41, FIG. 17 is a front view for showing the micro-lens array 43, and FIG. 18 is a front view for showing the light receiving element substrate 42 having a light receiving element array 45.

Since the overall structure of the optical transmission path coupling apparatus relating to the present embodiment is almost similar to that of the optical transmission path coupling apparatus relating to the fist or the second embodiment, the same portions are attached with the same reference numbers and their explanation will be omitted.

According to the present embodiment, optical path windows 51 of the Si substrate 41 are formed in a plane rectangular long hole shape. The guide holes 9 provided in the Si substrate 2 of the first embodiment are not provided.

At one side of the Si substrate 41, the light receiving element substrate 42 is fitted. Further, the light receiving element protection model 20 constituted by the frame section 21 and the lid section 22 referred to in the first embodiment are fitted to cover the light receiving element substrate 42.

At the other side of the Si substrate 41, the micro-lens array 43 and the lens protection model 44 for supporting this which are the characteristics of the present embodiment are provided.

Figure 8:
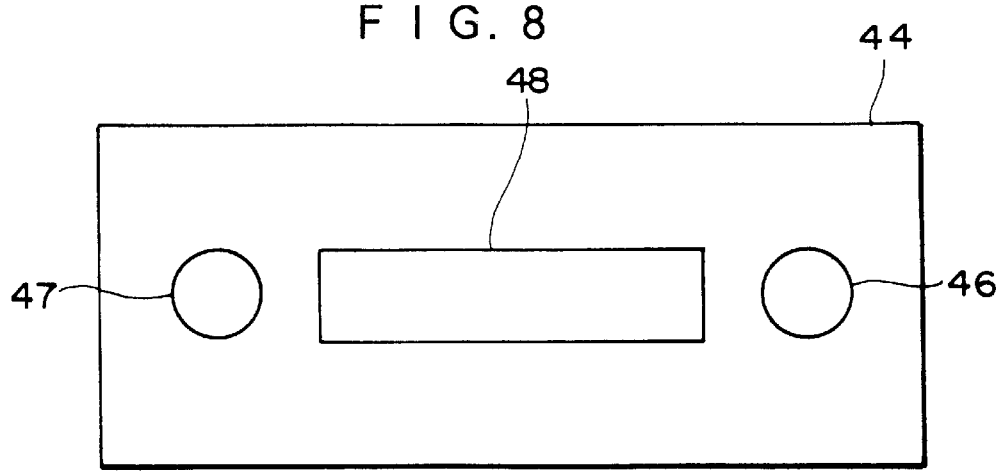
FIG. 8 is a front view for showing a lens protection model.

The micro-lens array 43 is structured by adjusting the refractive index distribution. Therefore, the micro-lens array 43 is formed in a plane shape without having an external projection. The lens protection model 44 is formed in a thick and rectangular shape overall similar to that of the Si substrate 41, and guide pins 46 and 47 are provided in alignment with the guide pin holes 3 and 4 of the Si substrate 41, as shown in FIG. 8. Between the guide pin holes 46 and 47, a lens engagement hole 48 for engagement supporting the micro-lens array 43 is provided. The lens engagement hole 48 and the micro-lens array 43 are finished in high precision by the anisotropic etching technique. By this arrangement, the inner dimensions of the lens engagement hole 48 are set to accurately match the outer dimensions of the micro-lens array 43 so as to support accurately the micro-lens array 43. In other words, when the lens protection model 44 is fitted to match the Si substrate 41 in a state that the micro-lens array 43 is engaged with the lens engagement hole 48, the optical axes of the micro-lenses 43A and the optical axes of the light receiving elements 42A of the light receiving element substrate 42 are coincided with each other.

[Effects]

With the above-described structure, a high-precision positioning can be achieved by supporting the micro-lens array 43 with the lens protection model 44.

[Fourth Embodiment]

The present embodiment cancels an occurrence of an error at the time of forming parts by the anisotropic etching.

While the anisotropic etching is a technique suitable for finishing parts in high precision, even this technique causes an occurrence of an error which becomes a problem from the viewpoint of an optical level.

FIG. 19 is a schematic view for showing an optical axial deviation due to an error when guide pin holes 62 and 63 of a Si substrate 61 are formed by the anisotropic etching technique. Though an error due to the anisotropic etching is generally about $1/100$, it is assumed that an error of $1/10$ has occurred in this case for sake of explanation. Referring to FIG. 19, the guide holes 62 and 63 of the Si substrate 61 are provided from the left plane to the right plane by the anisotropic etching. In this case, the diameter of the hole at the left plane side where the hole is formed at the beginning is slightly larger than the diameter of the hole at the right plane side where the hole is formed last. Therefore, the guide pins 64 inserted into the guide pin holes 62 and 63 rotate around the right end where the diameters of the guide pin holes 62 and 63 are relatively the smallest as shown by one-point chained lines in FIG. 19. As a result, a light beam incident to a light receiving element (not shown) of the light receiving element substrate 65 from an optical fiber is deviated by an angle shown by the one-point chained lines.

Figure 20:
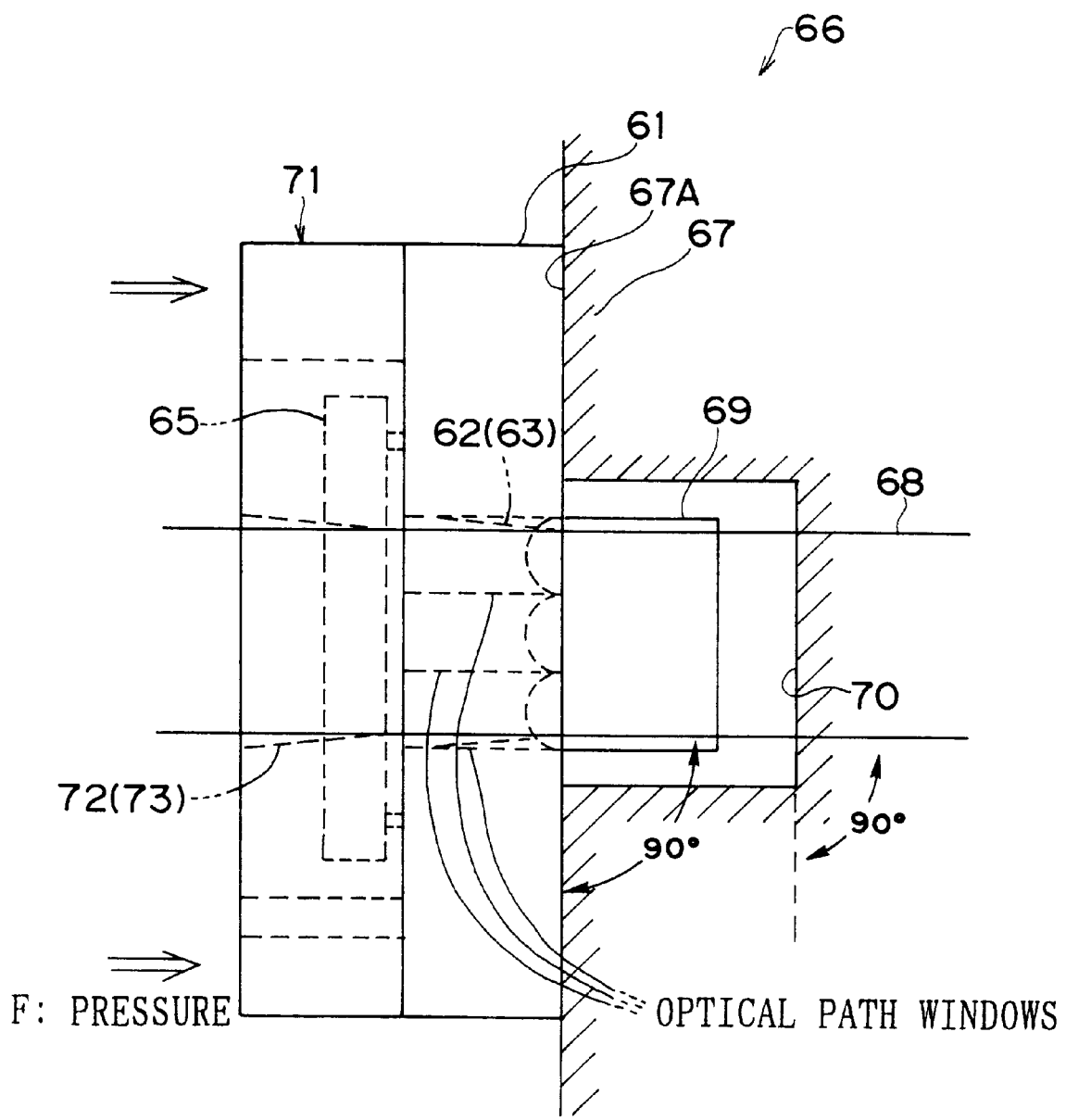
FIG. 20 is a side view for showing an optical axis self-alignment tool.

An optical axis self-alignment tool 66 shown in FIG. 20 cancels this optical axis deviation. The optical axis self-alignment tool 66 is structured by a base stand 67 for adjusting the optical axes of the guide pin holes 62 and 63 perpendicularly to a base plane 67A by keeping in contact with the Si substrate 61, and guide pins 68 fitted perpendicularly to the base plane of the base stand 67. The base stand 67 has the base plane 67A which is brought into contact with the Si substrate 61. The base plane 67A is provided with a micro-lens array accommodating recess section 70 for accommodating the micro-lens array 69 which is fitted to the Si substrate 61. The guide pins 68 are provided by two with the same diameter and the same distance therebetween corresponding to the diameters and the distance of the guide pin holes 62 and 63 of the Si substrate 61.

[Operation]

The adjustment of the optical axes using the optical axis self-alignment tool 66 of the above-described structure is carried out as follows.

One side plane of the Si substrate 61 is brought into contact with the base plane 67A of the optical axis self-alignment tool 66 in a state that the guide pin holes 62 and 63 of the Si substrate 61 are engaged with the guide pins 68 of the optical axis self-alignment tool 66. In this state, the guide pins 68 of the optical axis self-alignment tool 66 are contacted to the portions of the minimum diameter of the guide pin holes 62 and 63. Then, the optical axes of the guide pin holes 62 and 63 of the Si substrate 61 and the optical axes of the guide pins 68 of the optical axis self-alignment tool 66 are matched together accurately.

Then, an element sealing model 71 for sealing the light receiving element array 65 fitted to the other side plane of the Si substrate 61 is installed. More specifically, the element sealing model 71 is inserted until this is brought into contact with the Si substrate 61 in a state that the guide pin holes 72 and 73 of the element sealing model 71 are engaged with the guide pins 68 of the optical axis self-alignment tool 66. In this state, the guide pins 68 are keeping in contact with the minimum diameter portions of the guide pin holes 72 and 73, in the manner similar to the above. Thus, the optical axes of the guide pin holes 72 and 73 of the element sealing model 71 and the optical axes of the guide pins 68 of the optical axis self-alignment tool 66 are matched together accurately.

With the above-describe arrangement, the optical axes of the guide pin holes 62 and 63 of the Si substrate 61 and the optical axes of the guide pin holes 72 and 73 of the element sealing model 71 are matched together accurately. In this state, the Si substrate 61 and the element sealing model 71 are fixed together with an adhesive agent or the like.

When the lens protection model 44 is provided in the Si substrate 41 as shown in FIG. 14, the insertion and fixing are carried out sequentially starting from the lens protection model 44 side.

[Effects]

Even if there is an error in the size of a guide pin hole between the entrance and exit of the guide hole, an optical transmission path coupling apparatus can be produced in high precision without a deviation of the optical axis.

[Modified Examples]

(1) When a resin injection sealing is used as means for sealing, the effects similar to those described above can also be obtained.

(2) When elements having the optical elements and other elements such as LSIs integrated together are used in place of the light receiving element substrate 16, the effects similar to those described above can also be obtained. Further, when LSIs are used, the apparatus can be made compact which it is easy to handle.

(3) The optical path windows, guide holes and guide pin holes may also have polygonal shapes not only circular or rectangular shapes.

The shapes of the bumps, pads and wiring pattern are not limited to those shown in the drawings but various other shapes can also be taken to have the same effects as those described above.

(4) The holes of the substrate can also be shaped by laser or mechanical fine processing not only by etching to have the same effects as those described above.

(5) The forming of the holes of the substrate by silicon etching may also be replaced by forming based on the V groove etching of the (111) surface to have through-holes on a thin substrate in one substrate or by combining a plurality of substrates, without changing the similar effects obtained as described above.

As described above in detail, according to the present invention, accurate positioning can be achieved in a simple structure as well as facilitating a cost reduction.

Further, according to the present invention, reduction in communication performance due to deterioration of the optical elements and generation of dew can be prevented securely.

While the embodiments of the present invention as herein disclosed constitute a preferred form, it is to be understood that other forms might be adopted.

What is claimed is:

1. An optical transmission path coupling method for coupling optical transmission paths by matching mutual optical axes by engaging guide pin holes provided on one side member with guide pins provided on the other side member, comprising the steps of:

disposing bumps for fitting a substrate for an optical system and optical elements at positions specified based on said guide pin holes on said one side member or based on said guide pins on said other side member, disposing pads for flip chip bonding at positions corresponding to said bumps of said substrate for optical elements to be fitted to said one side member or said other side member and disposing said optical elements at positions corresponding to said optical system based on said pads, and matching automatically optical axes of said optical system of said one side member or said other side member and optical axes of said optical elements of said substrate for optical elements by flip chip bonding between said bumps and said pads.

2. An optical transmission path coupling method for coupling optical transmission paths by matching mutual optical axes by engaging guide pin holes provided on one side member with guide pins provided on the other side member, comprising the steps of:

providing windows for optical paths and guide holes disposed at positions specified based on said optical path windows on said one side member or said other side member and fitting a micro-lens array to face said optical path windows and said guide holes, structuring said micro-lens array by a plurality of micro-lenses having projections, one part of which become optical transmission lenses disposed to match their corresponding optical axes with said optical path windows and said other part of which become positioning lenses for carrying out positioning by engaging projections of said other part with said guide holes, and matching said optical axes of said optical transmission lenses with said optical axes of said optical transmission windows by engaging said projections of said positioning lenses with said guide holes.

3. An optical transmission path coupling method for coupling optical transmission paths by matching mutual optical axes by engaging guide pin holes provided on one side member with guide pins provided on the other side member, comprising the steps of:

providing windows for optical paths and guide holes disposed at positions specified based on said optical path windows on said one side member or said other side member and fitting a micro-lens array to face said optical path windows and said guide holes, structuring said micro-lens array by a plurality of micro-lenses, one part of which become optical transmission lenses disposed to match their corresponding optical axes with said optical path windows and said other part of which become positioning lenses for carrying out positioning by being engaged with said guide holes, and matching said optical axes of said optical transmission lenses with said optical axes of said optical transmission windows by engaging said positioning lenses with said guide holes.

4. An optical transmission path coupling method according to claim 2, wherein said guide holes are used as optical path windows.

5. An optical transmission path coupling method according to claim 3, wherein said guide holes are used as optical path windows.

6. An optical transmission path coupling method for coupling optical transmission paths by matching mutual optical axes by engaging guide pin holes provided on one side member with guide pins provided on the other side member, comprising the steps of:

disposing bumps for fitting a substrate for an optical system and optical elements at positions specified based on said guide pin holes at said one side member or based on said guide pins at said other side member, disposing pads for flip chip bonding at positions corresponding to said bumps of said substrate for optical elements to be fitted to said one side member or said other side member and disposing said optical elements at positions corresponding to said optical system based on said pads, matching automatically optical axes of said optical system on said one side member or said other side member and optical axes of said optical elements of said substrate for optical elements by flip chip bonding said bumps and said pads, structuring said optical system by optical path windows and guide holes disposed at positions specified based on said optical path windows, and fitting a micro-lens array to face said optical system, structuring said micro-lens array by a plurality of micro-lenses having projections, one part of which become optical transmission lenses disposed to match their corresponding optical axes with said optical path windows and said other part of which become positioning lenses for carrying out positioning by engaging projections of said other part with said guide holes, and matching said optical axes of said optical transmission lenses with said optical axes of said optical transmission windows by engaging said projections of said positioning lenses with said guide holes.

7. An optical transmission path coupling method for coupling optical transmission paths by matching mutual optical axes by engaging guide pin holes provided on one side member with guide pins provided on the other side member, comprising the steps of:

disposing bumps for fitting a substrate for an optical system and optical elements at positions specified based on said guide pin holes on said one side member or based on said guide pins on said other side member, disposing pads for flip chip bonding at positions corresponding to said bumps of said substrate for optical elements to be fitted to said one side member or said other side member and disposing said optical elements at positions corresponding to said optical system based on said pads, matching automatically optical axes of said optical system of said one side member or said other side member with optical axes of said optical elements of said substrate for optical elements by flip chip bonding said bumps and said pads, structuring said optical system by optical path windows and guide holes disposed at positions specified based on said optical path windows and fitting a micro-lens array to face said optical system, structuring said micro-lens array by a plurality of micro-lenses, one part of which become optical transmission lenses disposed to match their corresponding optical axes with said optical path windows and said other part of which become positioning lenses for carrying out positioning by being engaged with said guide holes, and matching said optical axes of said optical transmission lenses with said optical axes of said optical transmission windows by engaging said positioning lenses with said guide holes.

8. An optical transmission path coupling method wherein a one side member having guide pin holes are engaged with guide pins on the other side member so that mutual optical axes are matched together to couple respective optical transmission paths, said one side member having said guide pins is brought into contact with a base plane of a base stand by being engaged with said guide pins provided perpendicularly to said base plane of said base stand, and an element sealing model having guide pin holes is engaged with said guide pins so that they are coupled with each other in a state that said one side member and said optical axes are matched together.

9. An optical transmission path coupling apparatus for coupling optical transmission paths including a one side member having guide pin holes and the other side member having guide pins for coupling optical transmission paths so as to match mutual optical axes by being engaged with said guide pin holes, comprising:

bumps for fitting a substrate for an optical system and optical elements disposed at specified positions based on said guide pin holes on said one side member or based on said guide pins on said other side member, an optical element substrate provided on said one side member or said other side member so as to face said bumps, for loading and supporting optical elements of which optical axes match said optical transmission path, pads for flip chip bonding disposed at positions corresponding to said bumps of said substrate for optical elements, and optical elements disposed at positions corresponding to said optical system based on said pads of said optical element substrate, so that said substrate for optical elements is fitted to said one side member or said other side member by flip chip bonding said bumps and said pads in a state that said optical axes of said optical system and said optical elements match together.

10. An optical transmission path coupling apparatus according to claim 9, wherein an optical system provided on said one side member or said other side member is structured by windows for optical paths and guide holes disposed at specified positions based on said optical path windows, with a micro-lens array being disposed to face said optical path windows on said one side member or said other side member, and said micro-lens array is structured by a plurality of micro-lenses having projections, one part of which become optical transmission lenses disposed to match their corresponding optical axes with said optical path windows and said other part of which are disposed to face said guide holes at specified positions based on said optical transmission lenses and become positioning lenses for matching said optical axes of said optical transmission lenses and said optical path windows together by engaging said projections with said guide holes.

11. An optical transmission path coupling apparatus according to claim 9, wherein an optical system provided on said one side member or said other side member is structured by windows for optical paths and guide holes disposed at specified positions based on said optical path windows, with a micro-lens array being disposed to face said optical path windows on said one side member or said other side member, and said micro-lens array is structured by a plurality of micro-lenses, one part of which become optical transmission lenses disposed to match their corresponding optical axes with said optical path windows and said other part of which are disposed to face said guide holes at specified positions based on said optical transmission lenses and become positioning lenses for matching said optical axes of said optical transmission lenses and said optical path windows together by being engaged with said guide holes.

12. An optical transmission path coupling apparatus according to claim 10, wherein said guide holes are used as optical path windows.

13. An optical transmission path coupling apparatus according to claim 11, wherein said guide holes are used as optical path windows.

14. An optical transmission path coupling apparatus for coupling optical transmission paths including a one side member having guide pin holes and the other side member having guide pins for coupling optical transmission paths so as to match mutual optical axes, by being engaged with said guide pin holes, comprising:

bumps for fitting a substrate for an optical system and optical elements disposed at specified positions based on said guide pin holes on said one side member or based on said guide pins on said other side member, an optical element substrate provided on said one side member or said other side member so as to face said bumps, for loading and supporting optical elements of which optical axes match said optical transmission path, pads for flip chip bonding disposed at positions corresponding to said bumps of said substrate for optical elements, and optical elements disposed at positions corresponding to said optical system based on said pads of said optical element substrate, wherein said substrate for optical elements is fitted to said one side member or said other side member by flip chip bonding said bumps and said pads in a state that said optical axes of said optical system and said optical elements match together, said optical system is structured by windows for optical paths and guide holes disposed at specified positions based on said optical path windows, with a micro-lens array being disposed to face said optical path windows on said one side member or said other side member, and said micro-lens array is structured by a plurality of micro-lenses having projections, one part of which become optical transmission lenses disposed to match their corresponding optical axes with said optical path windows and said other part of which are disposed to face said guide holes at specified positions based on said optical transmission lenses and become positioning lenses for matching said optical axes of said optical transmission lenses and said optical path windows together by engaging said projections with said guide holes.

15. An optical transmission path coupling apparatus for coupling optical transmission paths including a one side member having guide pin holes and the other side member having guide pins for coupling optical transmission paths so as to match mutual optical axes, by being engaged with said guide pin holes, comprising:

bumps for fitting a substrate for an optical system and optical elements disposed at specified positions based on said guide pin holes on said one side member or based on said guide pins on said other side member, an optical element substrate provided on said one side member or said other side member so as to face said bumps, for loading and supporting optical elements of which optical axes match said optical transmission path, pads for flip chip bonding disposed at positions corresponding to said bumps of said substrate for optical elements, and optical elements disposed at positions corresponding to said optical system based on said pads of said optical element substrate, wherein said substrate for optical elements is fitted to said one side member or said other side member by flip chip bonding said bumps and said pads in a state that said optical axes of said optical system and said optical elements match together, said optical system is structured by windows for optical paths and guide holes disposed at specified positions based on said optical path windows, with a micro-lens array being disposed to face said optical path windows on said one side member or said other side member, said micro-lens array is structured by a plurality of micro-lenses, one part of which become optical transmission lenses disposed to match their corresponding optical axes with said optical path windows and said other part of which are disposed to face said guide holes at specified positions based on said optical transmission lenses and become positioning lenses for matching said optical axes of said optical transmission lenses and said optical path windows together by being engaged with said guide holes.

16. An optical transmission path coupling apparatus according to claims 10, wherein
said positioning lens and optical transmission lens are disposed by one or by a plurality of number respectively.

17. An optical transmission path coupling apparatus according to claims 11, wherein
said positioning lens and optical transmission lens are disposed by one or by a plurality of number respectively.

18. An optical transmission path coupling apparatus according to claims 12, wherein
said positioning lens and optical transmission lens are disposed by one or by a plurality of number respectively.

19. An optical transmission path coupling apparatus according to claims 13, wherein
said positioning lens and optical transmission lens are disposed by one or by a plurality of number respectively.

20. An optical transmission path coupling apparatus according to claims 14, wherein
said positioning lens and optical transmission lens are disposed by one or by a plurality of number respectively.

21. An optical transmission path coupling apparatus according to claims 15, wherein
said positioning lens and optical transmission lens are disposed by one or by a plurality of number respectively.

22. An optical transmission path coupling apparatus according to claims 10, wherein,
said optical transmission path is structured by using optical fibers and said front ends of said optical fibers are directly contacted to said rear surface of said optical transmission lens.

23. An optical transmission path coupling apparatus according to claims 11, wherein,
said optical transmission path is structured by using optical fibers and said front ends of said optical fibers are directly contacted to said rear surface of said optical transmission lens.

24. An optical transmission path coupling apparatus according to claims 12, wherein,
said optical transmission path is structured by using optical fibers and said front ends of said optical fibers are directly contacted to said rear surface of said optical transmission lens.

25. An optical transmission path coupling apparatus according to claims 13, wherein,
said optical transmission path is structured by using optical fibers and said front ends of said optical fibers are directly contacted to said rear surface of said optical transmission lens.

26. An optical transmission path coupling apparatus according to claims 14, wherein,
said optical transmission path is structured by using optical fibers and said front ends of said optical fibers are directly contacted to said rear surface of said optical transmission lens.

27. An optical transmission path coupling apparatus according to claims 15, wherein,
said optical transmission path is structured by using optical fibers and said front ends of said optical fibers are directly contacted to said rear surface of said optical transmission lens.

* * * * *